United States Patent [19]
Garretson

[11] 3,929,155
[45] Dec. 30, 1975

[54] FLOAT SHUT OFF VALVE FOR LIQUEFIED PETROLEUM GAS TANK FILLERS

[76] Inventor: Owen L. Garretson, P.O. Box 108, Farmington, N. Mex. 87401

[22] Filed: Sept. 3, 1974

[21] Appl. No.: 502,612

Related U.S. Application Data

[63] Continuation of Ser. No. 288,132, Sept. 11, 1975, abandoned.

[52] U.S. Cl. .................. 137/430; 141/198; 251/29
[51] Int. Cl.² .......................................... F16K 31/18
[58] Field of Search ........... 137/414, 429, 430, 433; 141/40, 46, 198–229; 251/29

[56] References Cited
UNITED STATES PATENTS 3,076,486  2/1963  Abbey et al. .................... 141/215 X
3,796,240  3/1974  Miller .................................. 141/198

Primary Examiner—Richard E. Aegerter
Assistant Examiner—Frederick R. Schmidt
Attorney, Agent, or Firm—Larson, Taylor & Hinds

[57] ABSTRACT

A float valve assembly to be attached to a standard liquefied petroleum gas tank filler assembly and inserted into the interior of the tank at a predetermined distance whereby the foat closes a small valve located within the assembly when the liquid level in the tank reaches a desired point and the back pressure trapped between this small valve and a check valve thereupon closes the check valve to shut off the flow of liquefied petroleum gas into the tank. The float valve also operates to prevent any flow of liquefied petroleum gas into the tank except when the float valve is in its upright position.

10 Claims, 2 Drawing Figures

FLOAT SHUT OFF VALVE FOR LIQUEFIED PETROLEUM GAS TANK FILLERS

This is a continuation, of application Ser. No. 288,132 filed Sept. 11, 1972, now abandoned.

BACKGROUND OF THE INVENTION

This invention relates to liquefied petroleum gas filler valves and in particular is a shut off assembly incorporating a float valve which serves to cause the flow of liquefied petroleum gas into the tank to be shut off when the liquid level in the tank reaches a predetermined point, and prevents filling unless the float valve is in its upright position.

This invention lies in the field of liquefied petroleum gas filling devices, possibly classified in Group Art Unit No. 347.

DESCRIPTION OF THE PRIOR ART

One of the problems that presently exists in the area of filler valves for liquefied petroleum gas is to design the tank and filler valve so that maximum filling can be achieved with sufficient gas expansion room being left in the tank after it is filled. At the present time this type of filling is attempted simply by the experience of the operator and often results in containers being overfilled. When the container is overfilled and a sufficiently large temperature rise occurs, the tank becomes overfull causing a large rise in internal tank pressure and release of fuel in some way such as through a relief valve. It is therefore desirable to incorporate into a liquefied petroleum gas tank filler valve an assembly which automatically shuts off the incoming fluid when a desired fill level is achieved without the need for the operator using manual operations to shut off the incoming flow. Moreover, it is desirable that the tank not be filled if the filler valve is in other than its normal operating position.

BRIEF DESCRIPTION OF THE INVENTION

It is therefore an object of this invention to provide a float shut off valve for a liquefied petroleum gas filler assembly which shuts off the incoming fluid when a predetermined liquid level is reached within the tank.

It is a further object of this invention to provide a float shut off valve for liquefied petroleum gas tank filler valves which prevents filling if the container or filler valve is in other than its upright or normal filling position.

A further object of this invention is to provide a float shut off valve for liquefied petroleum gas tank filler assemblies that can be easily installed in existing filler valves and can be operated with a minimum of complicated moving parts.

A further object of this invention is to provide a float shut off valve for liquefied petroleum gas tank filler assemblies which can be designed to be rugged in use, easily transportable, easily removeable, dependable and simple in its operation.

Other objects of this invention will become apparent as the same is better understood by reference to the following specification and accompanying drawings wherein:

DETAILED SPECIFICATION

Figures 1, 2:
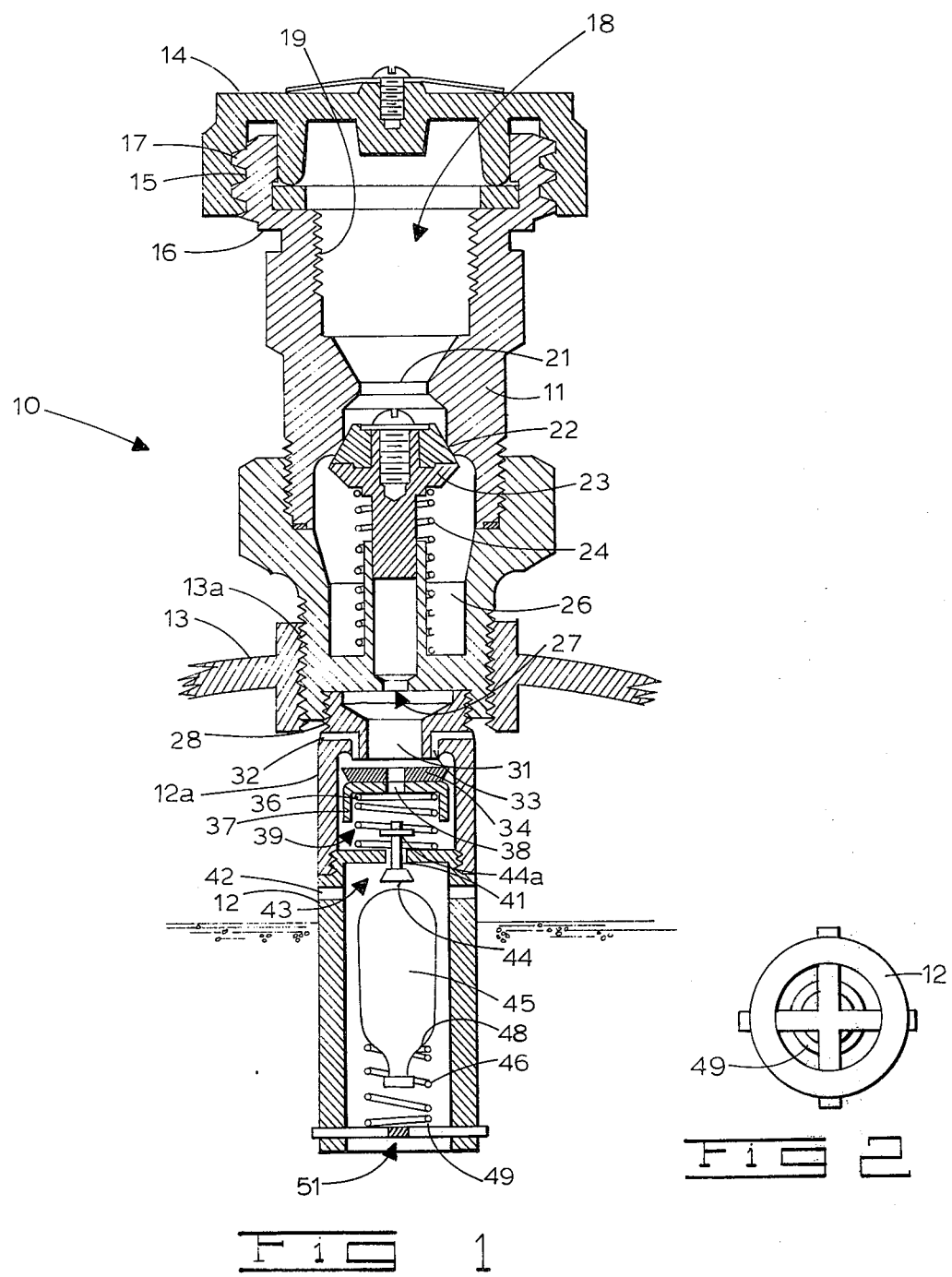
FIG. 1 is a cross-sectional view of a float shut off valve attached to a standard liquefied petroleum gas tank filler assembly, constituting one embodiment of this invention.
FIG. 2 is a view of the bottom of the float shut off valve assembly showing the liquid inlet to actuate the float which constitutes a part of this invention.

There are many different ways in which to modify the float shut off valve comprising this invention. What is shown in the drawings and the following detailed specifications is one embodiment of this particular invention.

A liquefied petroleum gas filler valve assembly 10 comprises a top portion 11 which is a standard filler valve assembly and a bottom portion 12 which is the float shut off valve assembly which comprises the present invention. This entire assembly is inserted through a tank wall 13 and may be threadedly engaged into the wall of the tank as at 13a with a fluid tight threaded connection.

The standard filler valve assembly 11 comprises a removeable cap 14 which closes the top of the filler valve when the device is not in use. Filler valve cap 14 has internal threads 15 so that the cap 14 may be removeably attached over the filler mouth 16 by screwing onto threaded connection 17. A throat 18 is provided through the center of filler valve 11 along its longitudinal axis for receipt of incoming liquefied petroleum gas when the device is in operation. Internal threads 19 may be machined into the interior of throat 18 for a fluid tight connection of a filler nozzle such as at the end of a hose connected to a pump. The attachment between a nozzle and threaded connection 19 is made before the tank filling operation.

A restriction 21 is normally provided in throat 18 to channel the incoming liquefied petroleum gas into a filler check valve. The lowermost portion of throat restriction 21 provides a seat 22 for the filler check valve 23. A helical spring 24 biases filler check valve 23 into engagement with check valve seat 22 to normally close the valve until the pressure of incoming liquefied petroleum gas forces it open to begin the filling process.

A fluid passage 26 is machined into the filler valve assembly down stream from filler check valve 23. Incoming liquefied petroleum gas passes through throat restriction 21, check valve 23 and into fluid passage 26. The bottom portion 27 of standard valve assembly 11 includes the standard discharge port for such filler valves. In order to incorporate the present invention, float shut off valve assembly 12, the bottom portion of standard filler valve assembly 11 may be provided with threads, as at 28, for removeable engagement of shut off valve assembly 12 to the bottom discharge port 27 of the standard filler valve assembly 11.

As shown in FIG. 1, the housing 12a of the shut off valve assembly 12 forms a fluid channel 31 directly connecting the discharge port 27 of standard filler valve 11 into shut off valve discharge ports 32 at its other end when the device is assembled. Shut off valve discharge ports 32 are provided in shut off valve assembly 12 for discharge of incoming liquefied petroleum gas into the liquefied petroleum gas tank. A shut off valve seat 33 is provided across the bottom of discharge ports 32, with a shut off valve closure member 34 being located proximate to shut off valve seat 33.

As can be seen, shut off valve closure member 34 is biased toward shut off valve seat 33 by means of a helical spring 36 with one end being seated in spring housing 37 and the other end being seated on shoulders of the shut off valve assembly. The walls of float shut off valve assembly 12 form a housing surrounding the shut off valve assembly to provide a pressure chamber 39, having valve closure member 34 forming one end of the chamber, and the housing for the float assembly forming the other end of the chamber.

A pressure inlet passage 38 extends through valve closure member 34 and into shut off valve pressure chamber 39 which is in turn connected through pressure outlet passage 41 to pressure relief ports 42. Thus under normal operating conditions any back pressure caused by incoming liquefied petroleum gas is relieved and the force of the incoming gas overcomes the force of bias spring 36 to thereby allow opening of valve 34 and discharge of gas into tank 13.

A float valve assembly 43 operates to close pressure chamber 39 when the liquid level in the tank reaches a predetermined point. Float valve assembly 43 comprises a valve 44 having a keeper 44a attached thereto to prevent its falling out of pressure relief passage 41 when the valve 44 is open. A float 45, consisting of a sealed chamber is located within the housing of float valve assembly 12. A bias spring 46 which has one end 48 engaging the shoulders of the float 45 and the other end 49 seated on the bottom 51 of the valve assembly 12 urges float 45 into light contact or engagement with float valve 44. Until the liquid level in the tank reaches a predetermined point the pressure of incoming liquefied petroleum gas flows past open valve 44 and allows liquid flow through the assembly into the tank. As the liquid level rises within the tank, the force of liquid buoyancy combining with the force of bias spring 46 urges float 45 upward into engagement with valve 44 to close pressure relief passage 41. Obviously the amount of rise of float 45 as well as its buoyancy and the distance of travel of valve 44, and to only a minor extent the force of incoming gas will determine the liquid level at which valve 44 is closed.

Upon the closure of valve 44 the pressure of incoming gas passing through inlet pressure port 38 causes a build up of pressure within pressure chamber 39 which combined with the force of bias spring 36 urges check valve closure member 34 into engagement with valve seat 33 to close discharge passages 32 and cause a shut off of the entire filler assembly. Obviously the higher the pressure of incoming gas the higher will be the pressure in pressure chamber 34 so that increased pressure has little or no effect to fill the tank beyond its designed level.

Obviously the filler valve assembly must be in an upright position if float 45 is to be removed from engagement with valve closure member 44 and allow the filler valve to be operated. If the tank is on its side or upside down, float 45 is closed by spring 36 and the shut off valve assembly thereby prevents filling.

Obviously float valve 43 can be modified in many ways to achieve the results of the device described above. For example, the float could swing on a pivoted arm or pressure outlet passage 41 could be of the double ported balanced or piston type so that the filling pressure would not press against the float to any extent. Additionally, the pressure chamber 34 could be formed into a bellows, or a diaphragm actuator could be used to actuate the valve closure member, with a relief port 41 and inlet 38 incorporated therein. Additionally it can be seen that if the top 11 of the filler assembly were to be accidentally knocked off or sheared off from the tank assembly the only possible escape port for gas from within tank 13 would be through pressure port 38 which would be an insignificant or negligible amount. Moreover, the pressure of the outflowing gas would cause the shut off valve to close.

Obviously many advantages and modifications of this invention can be made by the skilled mechanic. It is not the intent of this invention to be limited by the specific embodiment described above, but by any modifications within the knowledge of the skilled mechanic.

What is claimed is:

1. A liquefied petroleum gas tank filler valve assembly, comprising a filler valve body having a flow passage extending therethrough from a filler mouth, a check valve in said flow passage, attachment means on the exterior of said body for sealingly securing said body vertically in an opening in the top of a liquefied petroleum gas tank which is normally vertical during filling, means defining a housing of relatively reduced diameter extending from said body adjacent said attachment means such that said housing will pass freely through an opening in which said attachment means secures said body and thus extend downwardly into the interior of a tank, said body and said housing being rigidly secured together so as to be mountable as an integral unit on and in a tank, discharge port means communicating with said flow passage and opening from the assembly below said attachment means so as to open into a tank in which the assembly is mounted, shut-off valve means movable between open and closed positions for controlling flow from said passage to said discharge port means, said shut-off valve comprising a valve closure member movable between open and closed positions and having opposed pressure surfaces, spring means having a closing force for normally maintaining said valve closure member in its closed position except when a net pressure force on said opposed pressure surfaces in an opening direction exceeds the closing force of said spring during filling of a tank in which the assembly is mounted, automatic means, including a float carried by said housing, responsive to the level of liquid in a tank in which the assembly is mounted for reducing said net pressure force to a value less than the closing force of said spring when such liquid level reaches a predetermined level, and override means responsive to the orientation of the assembly for causing said automatic means to reduce said net pressure force as aforesaid when the assembly is oriented beyond a predetermined amount from the vertical, regardless of the liquid level in a tank in which the device is mounted.

2. Apparatus as claimed in claim 1 wherein said attachment means on the periphery of said body comprises screw threads, and said housing is in the form of a reduced-diameter longitudinal extension of said body below said screw threads.

3. Apparatus as claimed in claim 2 wherein said housing is rigidly but detachably connected to said body.

4. Apparatus as claimed in claim 3 wherein said shut-off valve means and said discharge ports are carried by said housing.

5. Apparatus as claimed in claim 4 wherein said housing carries a pressure chamber of which said valve closure member forms a part so that one pressure surface thereof is subjected to pressure in said chamber, the other pressure surface of said valve closure member being exposed to pressure in said flow passage, restricted orifice means fluidly communicating said pressure chamber with said flow passage, and a vent controlled by a valve for communicating said pressure chamber with the exterior of said housing, said valve controlled vent being located such that the valve thereof is opened and closed by said float.

6. Apparatus as claimed in claim 5 wherein said filler valve body is a standard liquefied petroleum gas filler valve, and said housing and its included elements comprise an attachment therefor.

7. Apparatus as claimed in claim 1 wherein said override means comprises a spring opposing the weight of said float, the spring force being less than the full weight of said float when the assembly is vertically oriented but greater than the vector component of weight aligned with the spring force axis when the assembly is oriented beyond said predetermined amount from the vertical.

8. Apparatus as claimed in claim 1 mounted in a liquefied petroleum gas tank.

9. A liquefied petroleum gas tank filler valve assembly, comprising a filler valve body having a flow passage extending therethrough from a filler mouth, a check valve in said flow passage, attachment means on the exterior of said body for sealingly securing said body vertically in an opening in the top of a liquefied petroleum gas tank which is normally vertical during filling, means defining a housing of relatively reduced diameter extending from said body adjacent said attachment means such that said housing will pass freely through an opening in which said attachment means secures said body and thus extend downwardly into the interior of a tank, said body and said housing being rigidly secured together so as to be mountable as an integral unit on and in a tank, discharge port means communicating with said flow passage and opening from the assembly below said attachment means so as to open into a tank in which the assembly is mounted, shut-off valve means for controlling flow from said passage to said discharge port means, said shut-off valve means comprising a valve closure member movable between open and closed positions and having opposed pressure surfaces, spring means having a closing force for normally maintaining said valve closure member in its closed position except when a net pressure force on said opposed pressure surfaces in an opening direction exceeds the closing force of said spring during filling of a tank in which the assembly is mounted, automatic means, including a float carried by said housing, responsive to the level of liquid in a tank in which the assembly is mounted for reducing said net pressure force to a value less than the closing force of said spring when such liquid level reaches a predetermined level, said housing carrying a pressure chamber of which said valve closure member forms a part so that one pressure surface thereof is subjected to the pressure in said chamber, the other pressure surface of said valve closure member being exposed to pressure in said flow passage, restricted orifice means fluidly communicating said pressure chamber with said flow passage, a vent controlled by a valve for communicating said pressure chamber with the exterior of said housing, said valve controlled vent being located such that the valve thereof is opened and closed by said float, said discharge port means and said flow passage opening adjacent and facing said other pressure surface of said valve closure member, said discharge port openings being of annular configuration around the periphery of, and being axially parallel with, the flow passage opening, and said discharge port openings and flow passage opening being defined by valve seats simultaneously engageable by said other pressure surface of said closure valve member.

10. Apparatus as claimed in claim 9 further comprising spring means opposing the weight of said float and urging said float in a vent closing direction, the spring force being less than the full weight of said float when the assembly is vertically oriented but sufficient to bias said float to close said vent when the assembly is oriented beyond a predetermined amount from the vertical, regardless of the liquid level in a tank in which the device is mounted.

* * * * *